US012804638B2

(12) United States Patent
Zhou et al.

(10) Patent No.: US 12,804,638 B2
(45) Date of Patent: Nov. 17, 2026

(54) PHYSICAL UPLINK SHARED CHANNEL (PUSCH) TRANSMISSION IN JOINT DOWNLINK AND UPLINK TRANSMISSION CONFIGURATION INDICATOR (TCI) STATE SCENARIOS

(71) Applicant: QUALCOMM Incorporated, San Diego, CA (US)

(72) Inventors: Yan Zhou, San Diego, CA (US); Fang Yuan, Beijing (CN); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 623 days.

(21) Appl. No.: 18/006,534

(22) PCT Filed: Sep. 11, 2020

(86) PCT No.: PCT/CN2020/114812
§ 371 (c)(1),
(2) Date: Jan. 23, 2023

(87) PCT Pub. No.: WO2022/052044
PCT Pub. Date: Mar. 17, 2022

(65) Prior Publication Data
US 2023/0300826 A1 Sep. 21, 2023

(51) Int. Cl.
*H04W 72/1268* (2023.01)
*H04B 7/06* (2006.01)
(Continued)

(52) U.S. Cl.
CPC .... *H04W 72/1268* (2013.01); *H04B 7/06952* (2023.05); *H04L 5/0051* (2013.01); *H04W 72/23* (2023.01)

(58) Field of Classification Search
None
See application file for complete search history.

(56) References Cited

U.S. PATENT DOCUMENTS 12,289,721 B2 * 4/2025 Matsumura ........... H04L 5/0023
2019/0190747 A1 6/2019 Park et al.
(Continued)

FOREIGN PATENT DOCUMENTS

CN 108206714 A 6/2018
CN 110149187 A 8/2019
(Continued)

OTHER PUBLICATIONS

International Search Report and Written Opinion—PCT/CN2020/114812—ISA/EPO—May 27, 2021.
(Continued)

*Primary Examiner* — Srinivasa R Reddivalam
(74) *Attorney, Agent, or Firm* — Harrity & Harrity, LLP

(57) ABSTRACT

This disclosure provides systems, methods, and apparatuses for physical uplink shared channel (PUSCH) communications in joint downlink and uplink transmission configuration indicator (TCI) state scenarios. In one aspect, a user equipment (UE) may transmit a sounding reference signal (SRS) resource for a codebook-based or non-codebook-based PUSCH communication before receiving a downlink control information (DCI) that schedules or activates the PUSCH communication. The UE may determine a TCI state for the PUSCH communication based on the received DCI, such as when the received DCI includes an indication of the TCI state, or based on the transmitted SRS, such as when the received DCI does not include an indication of the TCI state.

35 Claims, 9 Drawing Sheets

(51) Int. Cl.

| | |
|---|---|
| ***H04L 5/00*** | (2006.01) |
| ***H04W 72/23*** | (2023.01) |

(56) References Cited

U.S. PATENT DOCUMENTS

| | | | | |
|---|---|---|---|---|
| 2019/0320469 | A1 | 10/2019 | Huang et al. | |
| 2022/0239440 | A1* | 7/2022 | Go | H04L 5/0044 |
| 2022/0295299 | A1* | 9/2022 | Park | H04W 72/23 |
| 2022/0369124 | A1* | 11/2022 | Li | H04L 5/0044 |
| 2023/0024375 | A1 | 1/2023 | Yao et al. | |
| 2023/0132744 | A1* | 5/2023 | Guo | H04L 5/0023 370/329 |
| 2023/0283430 | A1* | 9/2023 | Zhu | H04L 5/0051 370/329 |
| 2023/0299901 | A1* | 9/2023 | Matsumura | H04W 16/28 370/330 |

FOREIGN PATENT DOCUMENTS

| | | | |
|---|---|---|---|
| CN | 110192355 | A | 8/2019 |
| CN | 110535614 | A | 12/2019 |
| CN | 110710281 | A | 1/2020 |
| CN | 111083773 | A | 4/2020 |
| CN | 111092710 | A | 5/2020 |

OTHER PUBLICATIONS

Moderator (Samsung): "Moderator Summary#2 for Multi-Beam Enhancement: Proposal Categorization", 3GPP TSG RAN WG1 #102-e, R1-2007189, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 27, 2020, XP051922607, 27 Pages.

Qualcomm Incorporated: "Beam Management for NR", 3GPP Draft, 3GPP TSG-RAN WG1 Meeting #95, R1-1813396, Beam Management for NR, 3rd Generation Partnership Project (3GPP), Mobile Competence Centre, 650, Route Des Lucioles, F-06921 Sophia-Antipolis Cedex, France, vol. RAN WG1. No. Spokane. US, Nov. 12, 2018-Nov. 16, 2018, Nov. 3, 2018 (Nov. 3, 2018), XP051479713, 5 Pages, the whole document.

Moderator ( Samsung): "Moderator Summary for Multi-beam Enhancement: Proposal Categorization", 3GPP TSG RAN WG1 #102-e, R1-2006985, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 26, 2020, 27 pages, XP052348354, Contributions OPPO and Samsung, p. 19-p. 20.

Moderator ( Samsung): "Moderator Summary for Multi-beam Enhancement: Proposal Categorization", 3GPP TSG RAN WG1 #102-e, R1-2006985, e-Meeting, Aug. 17-28, 2020, Aug. 26, 2020, 27 Pages, Sections 2-4.

Moderator (Samsung): "Moderator Summary#2 for Multi-Beam Enhancement: Proposal Categorization", 3GPP TSG RAN WG1 #102-e, R1-2007189, e-Meeting, Aug. 17-28, 2020, Aug. 27, 2020, 27 Pages, Section 2-4.

Supplementary European Search Report—EP20952832—Search Authority—The Hague—May 21, 2024.

ZTE: "Preliminary Views on Further Enhancement for NR MIMO", 3GPP TSG RAN WG1 Meeting #101-e, R1-2003483, 3rd Generation Partnership Project, Mobile Competence Centre, 650, Route Des Lucioles, F-06921 Sophia-Antipolis Cedex, France, vol. RAN WG1, e-Meeting, May 25, 2020-Jun. 5, 2020, 18 Pages, May 16, 2020, XP051885267, Sect. 6, Proposals 1 and 2, p. 16.

* cited by examiner

PHYSICAL UPLINK SHARED CHANNEL (PUSCH) TRANSMISSION IN JOINT DOWNLINK AND UPLINK TRANSMISSION CONFIGURATION INDICATOR (TCI) STATE SCENARIOS

CROSS-REFERENCE TO RELATED APPLICATION

This Patent Application is a 371 of Patent Cooperation Treaty (PCT) Patent Application No. PCT/CN2020/114812, filed Sep. 11, 2020, entitled "PHYSICAL UPLINK SHARED CHANNEL (PUSCH) TRANSMISSION IN JOINT DOWNLINK AND UPLINK TRANSMISSION CONFIGURATION INDICATOR (TCI) STATE SCENARIOS," and assigned to the assignee hereof. The disclosure of the prior Applications is considered part of and is incorporated by reference into this Patent Application.

TECHNICAL FIELD

Aspects of the present disclosure relate generally to wireless communication and to techniques for physical uplink shared channel (PUSCH) transmissions in joint downlink and uplink transmission configuration indicator (TCI) state scenarios.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a wireless communication device. The method may include transmitting a sounding reference signal (SRS) to a base station (BS) for configuration of a physical uplink shared channel (PUSCH) communication including a spatial filter corresponding to a transmission configuration indicator (TCI) state; and receiving, based on the SRS, a downlink control information (DCI) that schedules or activates the PUSCH communication.

In some aspects, the PUSCH communication is a codebook-based PUSCH communication. In some aspects, the TCI state is a joint downlink and uplink TCI state or an uplink TCI state. In some aspects, another spatial transmit filter of the SRS corresponds to: the TCI state, or a spatial reference signal of the TCI state. In some aspects, the DCI identifies a transmitted precoding matrix indicator, or a transmission rank determined based on the SRS. In some aspects, the DCI identifies the TCI state for the PUSCH communication, or a SRS resource indicator (SRI). In some aspects, the method includes determining the TCI state for the PUSCH communication based on the DCI.

In some aspects, the DCI does not include information identifying the TCI state, and further including determining the TCI state for the PUSCH communication based on the SRS. In some aspects, transmitting the SRS includes transmitting the SRS using an antenna port; and transmitting the PUSCH communication using the antenna port. In some aspects, the PUSCH communication is a non-codebook PUSCH communication. In some aspects, the TCI state is applied on a per layer basis to the PUSCH. In some aspects, the wireless communication device is a user equipment (UE) or a transmit receive point (TRP). In some aspects, the DCI is a multi-DCI (mDCI) and the wireless communication device is operating in a multi-transmit receive point (mTRP) communication mode.

Another innovative aspect of the subject matter described in this disclosure can be implemented in an apparatus of a wireless communication device for wireless communication. The apparatus may include a first interface to output an SRS for transmission to a BS for configuration of a PUSCH communication including a spatial filter corresponding to a TCI state; and a second interface to obtain, based on the SRS, a DCI that schedules or activates the PUSCH communication.

In some aspects, the PUSCH communication is a codebook-based PUSCH communication. In some aspects, the TCI state is a joint downlink and uplink TCI state or an uplink TCI state. In some aspects, another spatial transmit filter of the SRS corresponds to: the TCI state, or a spatial reference signal of the TCI state. In some aspects, the DCI identifies a transmitted precoding matrix indicator, or a transmission rank determined based on the SRS. In some aspects, the DCI identifies the TCI state for the PUSCH communication, or a SRI. In some aspects, the apparatus includes a processing system to determine the TCI state for the PUSCH communication based on the DCI.

In some aspects, the DCI does not include information identifying the TCI state, and the apparatus includes a processing system to determine the TCI state for the PUSCH communication based on the SRS. In some aspects, the second interface, when configured to output the SRS, is configured to output the SRS for transmission using an antenna port; and output the PUSCH communication for transmission using the antenna port. In some aspects, the PUSCH communication is a non-codebook PUSCH communication. In some aspects, the TCI state is applied on a per layer basis to the PUSCH. In some aspects, the apparatus is a UE or a TRP. In some aspects, the DCI is a mDCI and the wireless communication device is operating in an mTRP communication mode.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a wireless communication device, may cause the one or more processors to transmit a sounding reference signal (SRS) to a base station (BS) for configuration of a physical uplink shared channel (PUSCH) communication including a spatial filter corresponding to a transmission configuration indicator (TCI) state; and receive, based on the SRS, a downlink control information (DCI) that schedules or activates the PUSCH communication.

In some aspects, the PUSCH communication is a codebook-based PUSCH communication. In some aspects, the TCI state is a joint downlink and uplink TCI state or an uplink TCI state. In some aspects, another spatial transmit filter of the SRS corresponds to: the TCI state, or a spatial reference signal of the TCI state. In some aspects, the DCI identifies a transmitted precoding matrix indicator, or a transmission rank determined based on the SRS. In some aspects, the DCI identifies the TCI state for the PUSCH communication, or a SRI. In some aspects, the one or more instructions further cause the wireless communication device to determine the TCI state for the PUSCH communication based on the DCI.

In some aspects, the DCI does not include information identifying the TCI state, and the one or more instructions further cause the wireless communication device to determine the TCI state for the PUSCH communication based on the SRS. In some aspects, when the one or more instructions cause the wireless communication device to transmit the SRS, the one or more instructions cause the wireless communication device to transmit the SRS using an antenna port; and transmit the PUSCH communication using the antenna port. In some aspects, the PUSCH communication is a non-codebook PUSCH communication. In some aspects, the TCI state is applied on a per layer basis to the PUSCH. In some aspects, the wireless communication device is a UE or a TRP. In some aspects, the DCI is a mDCI and the wireless communication device is operating in an mTRP communication mode.

Another innovative aspect of the subject matter described in this disclosure can be implemented in an apparatus for wireless communication. The apparatus may include means for transmitting an SRS to a BS for configuration of a PUSCH communication including a spatial filter corresponding to a TCI state; and means for receiving, based on the SRS, a DCI that schedules or activates the PUSCH communication.

In some aspects, the PUSCH communication is a codebook-based PUSCH communication. In some aspects, the TCI state is a joint downlink and uplink TCI state or an uplink TCI state. In some aspects, another spatial transmit filter of the SRS corresponds to: the TCI state, or a spatial reference signal of the TCI state. In some aspects, the DCI identifies a transmitted precoding matrix indicator, or a transmission rank determined based on the SRS. In some aspects, the DCI identifies the TCI state for the PUSCH communication, or a SRI. In some aspects, the apparatus includes means for determining the TCI state for the PUSCH communication based on the DCI.

In some aspects, the DCI does not include information identifying the TCI state, and the apparatus includes means for determining the TCI state for the PUSCH communication based on the SRS. In some aspects, the means for transmitting the SRS, include means for transmitting the SRS using an antenna port; and means for transmitting the PUSCH communication using the antenna port. In some aspects, the PUSCH communication is a non-codebook PUSCH communication. In some aspects, the TCI state is applied on a per layer basis to the PUSCH. In some aspects, the apparatus is a UE or a TRP. In some aspects, the DCI is a mDCI and the apparatus is operating in an mTRP communication mode.

Another innovative aspect of the subject matter described in this disclosure can be implemented in a method of wireless communication performed by an apparatus of a base station (BS). The method may include receiving an SRS associated with configuration of a PUSCH communication including a spatial filter corresponding to a TCI state; and transmitting, based on the SRS, a DCI that schedules or activates the PUSCH communication.

In some aspects, the PUSCH communication is a codebook-based PUSCH communication. In some aspects, the TCI state is a joint downlink and uplink TCI state or an uplink TCI state. In some aspects, another spatial transmit filter of the SRS corresponds to: the TCI state, or a spatial reference signal of the TCI state. In some aspects, the DCI identifies a transmitted precoding matrix indicator, or a transmission rank determined based on the SRS. In some aspects, the DCI identifies: the TCI state for the PUSCH communication, or an SRI.

In some aspects, the method includes determining the TCI state for the PUSCH communication based on the DCI. In some aspects, the DCI does not include information identifying the TCI state, and the method includes determining the TCI state for the PUSCH communication based on the SRS. In some aspects, receiving the SRS includes receiving the SRS using an antenna port; and receiving the PUSCH communication using the antenna port. In some aspects, the PUSCH communication is a non-codebook PUSCH communication. In some aspects, the TCI state is applied on a per layer basis to the PUSCH. In some aspects, the DCI is a mDCI and the apparatus is operating in a mTRP communication mode.

Another innovative aspect of the subject matter described in this disclosure can be implemented in an apparatus of a BS for wireless communication. The apparatus may include a first interface configured to obtain an SRS associated with configuration of a PUSCH communication including a spatial filter corresponding to a TCI state; and a second interface configured to output, based on the SRS, a DCI for transmission that schedules or activates the PUSCH communication.

In some aspects, the PUSCH communication is a codebook-based PUSCH communication. In some aspects, the TCI state is a joint downlink and uplink TCI state or an uplink TCI state. In some aspects, another spatial transmit filter of the SRS corresponds to: the TCI state, or a spatial reference signal of the TCI state. In some aspects, the DCI identifies a transmitted precoding matrix indicator, or a transmission rank determined based on the SRS. In some aspects, the DCI identifies the TCI state for the PUSCH communication, or an SRI.

In some aspects, the apparatus includes a processing system configured to determine the TCI state for the PUSCH communication based on the DCI. In some aspects, the DCI does not include information identifying the TCI state, and the apparatus includes a processing system to determine the TCI state for the PUSCH communication based on the SRS. In some aspects, the first interface, when configured to obtain the SRS, is configured to obtain the SRS using an antenna port; and obtain the PUSCH communication using the antenna port. In some aspects, the PUSCH communication is a non-codebook PUSCH communication. In some aspects, the TCI state is applied on a per layer basis to the PUSCH. In some aspects, the DCI is a mDCI and the apparatus is operating in a mTRP communication mode.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to receive an SRS associated with configuration of a PUSCH communication including a spatial filter corresponding to a TCI state; and transmit, based on the SRS, a DCI that schedules or activates the PUSCH communication.

In some aspects, the PUSCH communication is a codebook-based PUSCH communication. In some aspects, the TCI state is a joint downlink and uplink TCI state or an uplink TCI state. In some aspects, another spatial transmit filter of the SRS corresponds to: the TCI state, or a spatial reference signal of the TCI state. In some aspects, the DCI identifies a transmitted precoding matrix indicator, or a transmission rank determined based on the SRS. In some aspects, the DCI identifies: the TCI state for the PUSCH communication, or an SRI.

In some aspects, the one or more instructions cause the BS to determine the TCI state for the PUSCH communication based on the DCI. In some aspects, the DCI does not include information identifying the TCI state, and the one or more instructions cause the BS to determine the TCI state for the PUSCH communication based on the SRS. In some aspects, the one or more instructions, that cause the BS to receive the SRS, cause the BS to receive the SRS using an antenna port; and receive the PUSCH communication using the antenna port. In some aspects, the PUSCH communication is a non-codebook PUSCH communication. In some aspects, the TCI state is applied on a per layer basis to the PUSCH. In some aspects, the DCI is a mDCI and the apparatus is operating in a mTRP communication mode.

Another innovative aspect of the subject matter described in this disclosure can be implemented in an apparatus for wireless communication. The apparatus may include means for means for receiving an SRS associated with configuration of a PUSCH communication including a spatial filter corresponding to a TCI state; and means for transmitting, based on the SRS, a DCI that schedules or activates the PUSCH communication.

In some aspects, the PUSCH communication is a codebook-based PUSCH communication. In some aspects, the TCI state is a joint downlink and uplink TCI state or an uplink TCI state. In some aspects, another spatial transmit filter of the SRS corresponds to: the TCI state, or a spatial reference signal of the TCI state. In some aspects, the DCI identifies a transmitted precoding matrix indicator, or a transmission rank determined based on the SRS. In some aspects, the DCI identifies: the TCI state for the PUSCH communication, or an SRI.

In some aspects, the apparatus includes means for determining the TCI state for the PUSCH communication based on the DCI. In some aspects, the DCI does not include information identifying the TCI state, and the apparatus includes means for determining the TCI state for the PUSCH communication based on the SRS. In some aspects, the means for receiving the SRS includes means for receiving the SRS using an antenna port; and means for receiving the PUSCH communication using the antenna port. In some aspects, the PUSCH communication is a non-codebook PUSCH communication. In some aspects, the TCI state is applied on a per layer basis to the PUSCH. In some aspects, the DCI is a mDCI and the apparatus is operating in a mTRP communication mode.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
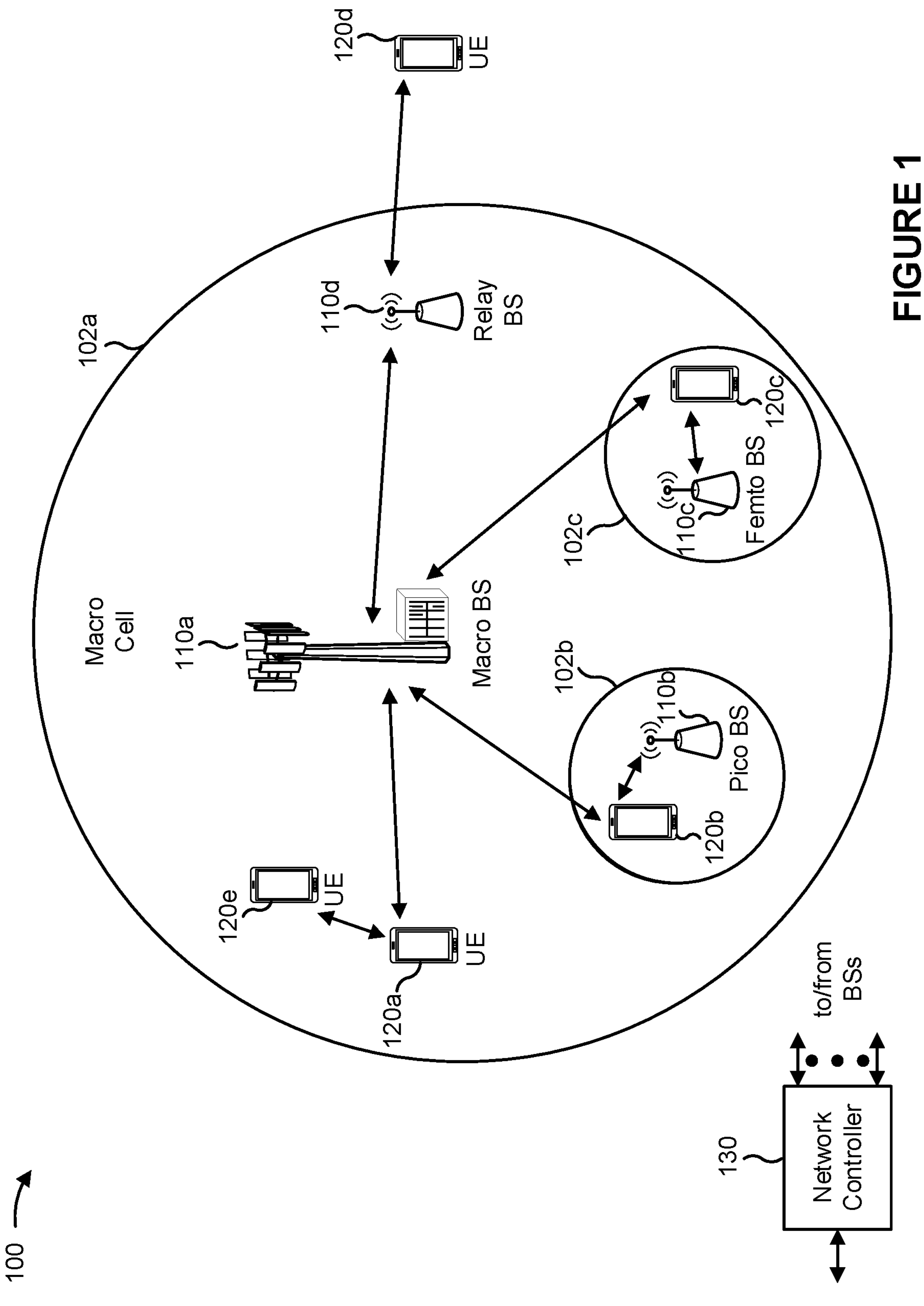
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some situations, a user equipment (UE) may decode a downlink transmission, from a base station (BS), using a transmission configuration indicator (TCI), such as a TCI-State, as defined in the 3GPP specifications, or another similar data structure. The TCI may indicate one or more quasi-co-location (QCL) rules, where a rule associates a reference signal (for example, a synchronization signal, such as a synchronization signal block (SSB); a channel state information (CSI) reference signal (CSI-RS); a positioning reference signal (PRS); or other reference signal) with an associated channel property (for example, a Doppler shift; a Doppler spread; an average delay; a delay spread; one or more spatial parameters, such as a spatial filter; or other properties). Such QCL rules may include QCL-TypeA, QCL-TypeB, QCL-TypeC, or QCL-TypeD data structures as defined by the 3GPP specifications.

Some standards (such as the 3GPP specifications) define a TCI for downlink communications from the BS to the UE. However, the BS and the UE generally manage uplink communications separately, which requires additional processing time as well as signaling and network overhead. Additionally, some standards (such as the 3GPP specifications) define a TCI with no more than two QCL rules.

A joint downlink and uplink TCI state may be defined in which a common beam is used for data and control transmission and reception. The joint downlink and uplink TCI state may be used in intra-band carrier aggregation (CA) scenarios among other examples of scenarios. Some aspects described herein may define one or more transmission rules for a joint downlink and uplink TCI state scenario, such as a rule regarding transmission of a sounding reference signal (SRS) and reception of a downlink control information (DCI) that activates a physical uplink shared channel (PUSCH) transmission. The one or more transmission rules may be applicable for codebook-based PUSCH transmissions or non-codebook-based PUSCH transmissions. For example, for codebook-based PUSCH transmissions with a spatial transmit filter indicated by a joint uplink and downlink TCI state or an uplink (only) TCI state, among other examples, a UE may transmit an SRS associated with at least one SRS resource before receiving a DCI scheduling or activating the codebook-based PUSCH. In some cases, the joint TCI state, the uplink TCI state, or spatial relation information indicated in a DCI scheduling or activating a PUSCH may include information identifying the spatial transmit filter. In such cases, the spatial transmit filter indicated in the aforementioned information may be derived from a corresponding joint TCI state, a corresponding uplink TCI state, or corresponding spatial relation information included in one or more SRS resources transmitted in connection with the PUSCH.

Particular implementations of the subject matter described in this disclosure can be implemented to realize one or more of the following potential advantages. As described herein, a UE may transmit an SRS and a BS may transmit a DCI, which may activate or schedule a PUSCH transmission, based on receiving the SRS. Use of a "common" beam in a joint downlink and uplink TCI scenario may enable a reduction in signaling and network overhead by using a single TCI (also referred to as a joint TCI or a joint downlink and uplink TCI) to indicate quasi co-location (QCL) rules for both uplink and downlink. The joint TCI may enable a unified TCI framework that may simplify a beam management procedure for not only downlink and uplink channels but also for data and control channels in 3GPP New Radio (NR) systems. Including an explicit beam indication, such as a TCI, in a DCI for PUSCH communication may enhance the flexibility for uplink transmissions, for example, when multiple SRSs of different beams are transmitted for codebook-based or non-codebook-based PUSCH communication.

FIG. 1 is a diagram illustrating an example of a wireless network 100. The wireless network 100 may be or may include elements of a 5G (NR) network, an LTE network, or another type of network. The wireless network 100 may include one or more base stations 110 (shown as BS 110*a*, BS 110*b*, BS 110*c*, and BS 110*d*) and other network entities. A base station (BS) is an entity that communicates with user equipment (UEs) and also may be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS.

A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

The wireless network 100 may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay BS 110*d* may communicate with a macro BS 110*a* and a UE 120*d* in order to facilitate communication between the macro BS 110*a* and the UE 120*d*. A relay BS also may be referred to as a relay station, a relay base station, a relay, etc.

The wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in the wireless network 100. For example, macro BSs may have a high transmit power level (for example, 5 to 40 watts) whereas pico BSs, femto BSs, and relay BSs may have lower transmit power levels (for example, 0.1 to 2 watts).

A network controller 130 may couple to a set of BSs and may provide coordination and control for these BSs. The network controller 130 may communicate with the BSs via a backhaul. The BSs also may communicate with one another, for example, directly or indirectly via a wireless or wireline backhaul.

Multiple UEs 120 (for example, a UE 120*a*, a UE 120*b*, a UE 120*c*, etc.) may be dispersed throughout the wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). A UE 120 may be included inside a housing that houses components of the UE 120, such as processor components, memory components, or other components. In some examples, the processor components and the memory components may be coupled together. For example, the processor components (for example, one or more processors) and the memory components (for example, a memory) may be operatively coupled, communicatively coupled, electronically coupled, or electrically coupled, among other examples.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some aspects, two or more UEs 120 (for example, shown as a UE 120*a* and a UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In such examples, the UE 120 may perform scheduling operations, resource selection operations, as well as other operations described elsewhere herein as being performed by the base station 110.

Devices of the wireless network 100 may communicate using the electromagnetic spectrum, which may be subdivided based on frequency or wavelength into various classes, bands, or channels. For example, devices of the wireless network 100 may communicate using an operating band having a first frequency range (FR1), which may span from 410 MHz to 7.125 GHz. As another example, devices of the wireless network 100 may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. It is contemplated that the frequencies included in FR1 and FR2 may be modified, and techniques described herein are applicable to those modified frequency ranges.

Figure 2:
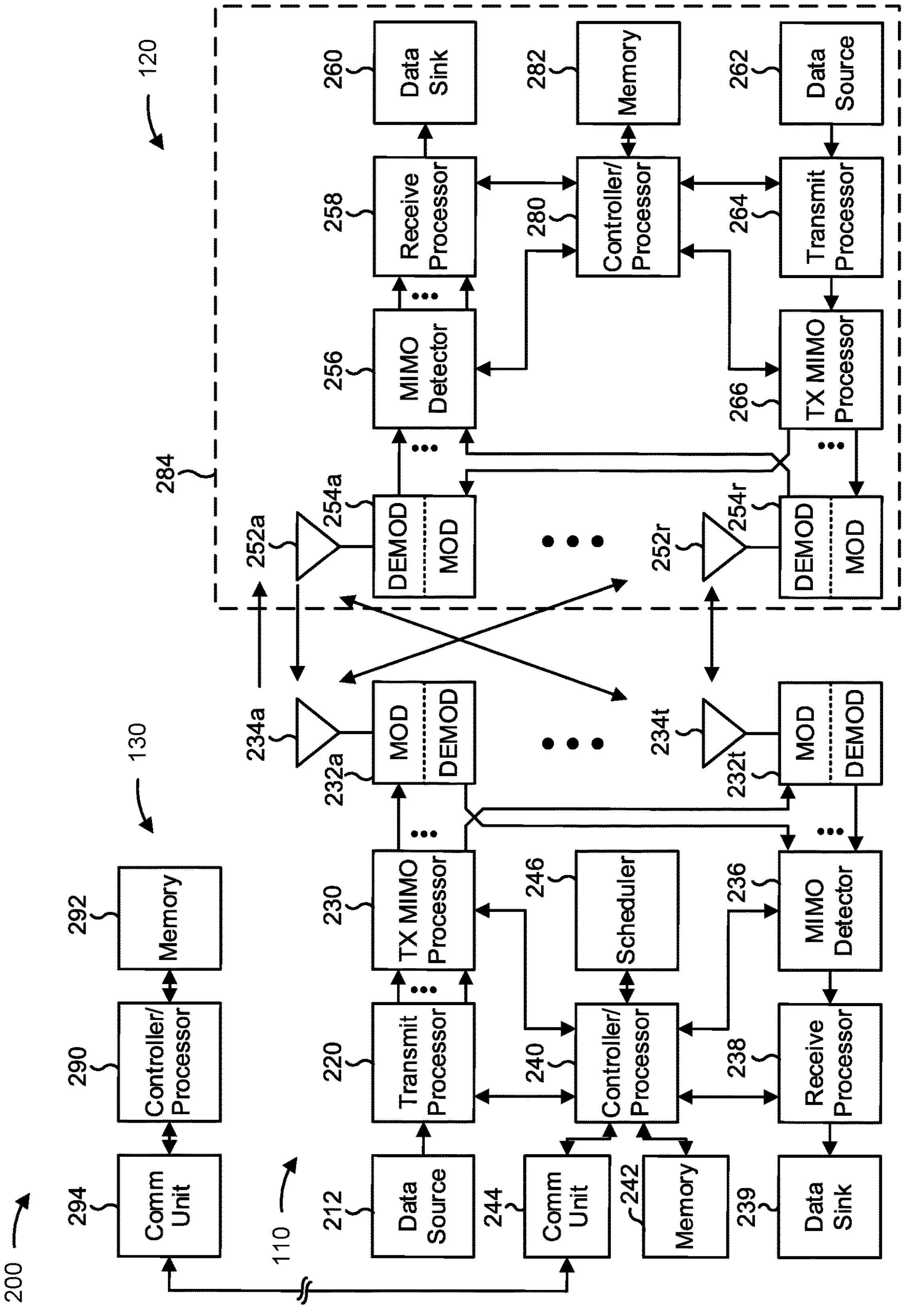
FIG. 2 is a diagram illustrating an example of a base station (BS) in communication with a user equipment (UE) in a wireless network.

FIG. 2 is a diagram illustrating an example 200 of a base station 110 in communication with a UE 120 in a wireless network 100. The base station 110 may be equipped with T antennas 234*a* through 234*t*, and the UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information and control information (for example, CQI requests, grants, upper layer signaling, etc.) and provide overhead symbols and control symbols. The transmit processor 220 also may generate reference symbols for reference signals and synchronization. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from the modulators 232*a* through 232*t* may be transmitted via T antennas 234*a* through 234*t*, respectively.

At the UE 120, the antennas 252*a* through 252*r* may receive the downlink signals from the base station 110 or other base stations and may provide received signals to the demodulators (DEMODs) 254*a* through 254*r*, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), etc. In some aspects, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

On the uplink, at the UE 120, a transmit processor 264 may receive and process data from a data source 262 and control information (for example, for reports including RSRP, RSSI, RSRQ, CQI, etc.) from a controller/processor 280. The transmit processor 264 also may generate reference symbols for one or more reference signals. The symbols from the transmit processor 264 may be precoded by a TX MIMO processor 266 if applicable, further processed by the modulators 254*a* through 254*r* (for example, for DFT-s-OFDM, CP-OFDM, etc.), and transmitted to the base station 110. In some aspects, the UE 120 includes a transceiver. The transceiver may include any combination of the antenna(s) 252, the modulators 254, the demodulators 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the base station 110, the uplink signals from the UE 120 and other UEs may be received by the antennas 234, processed by the demodulators 232, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include a communication unit 244 and may communicate with the network controller 130 via the communication unit 244. The base station 110 may include a scheduler 246 to schedule one or more UEs 120 for downlink communications, uplink communications, or a combination thereof. In some aspects, the base station 110 includes a transceiver. The transceiver may include any combination of the antenna(s) 234, the modulators 232, the demodulators 232, the MIMO detector 236, the receive processor 238, the transmit processor 220, or the TX MIMO processor 230. The transceiver may be used by a processor (for example, the controller/processor 240) and a memory 242 to perform aspects of any of the processes described herein.

In some implementations, the controller/processor 280 may be a component of a processing system. "Processing system" may generally refer to a system or series of machines or components that receives inputs and processes the inputs to produce a set of outputs (which may be passed to other systems or components of, for example, the UE 120). For example, "processing system of the UE 120" may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface to receive or obtain information, and a second interface to output, transmit or provide information. In some cases, "first interface" may refer to an interface between the processing system of the chip or modem and a receiver, such that the UE 120 may receive information or signal inputs, and the information may be passed to the processing system. In some cases, "second interface" may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the controller/processor 240 may be a component of a processing system. "Processing system" may generally refer to a system or series of machines or components that receives inputs and processes the inputs to produce a set of outputs (which may be passed to other systems or components of, for example, the base station 110). For example, "processing system of the base station 110" may refer to a system including the various other components or subcomponents of the base station 110.

The processing system of the base station 110 may interface with other components of the base station 110, and may process information received from other components (such as inputs or signals), output information to other components, etc. For example, a chip or modem of the base station 110 may include a processing system, a first interface to receive or obtain information, and a second interface to output, transmit or provide information. In some cases, the first interface may refer to an interface between the processing system of the chip or modem and a receiver, such that the base station 110 may receive information or signal inputs, and the information may be passed to the processing system. In some cases, the second interface may refer to an interface between the processing system of the chip or modem and a transmitter, such that the base station 110 may transmit information output from the chip or modem. A person having ordinary skill in the art will readily recognize that the second interface also may obtain or receive information or signal inputs, and the first interface also may output, transmit or provide information.

The controller/processor 240 of the base station 110, the controller/processor 280 of the UE 120, or any other component(s) of FIG. 2 may perform one or more techniques associated with PUSCH transmission in joint downlink and uplink TCI state scenarios, as described in more detail elsewhere herein. For example, the controller/processor 240 of the base station 110, the controller/processor 280 of the UE 120, or any other component(s) (or combinations of components) of FIG. 2 may perform or direct operations of process 600 of FIG. 6, process 700 of FIG. 7, or other processes as described herein. The memory 242 and the memory 282 may store data and program codes for the base station 110 and the UE 120, respectively. In some aspects, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of process 600 of FIG. 6, process 700 of FIG. 7, or other processes as described herein.

In some aspects, the UE 120 or another wireless communication device may include means for transmitting an SRS to a BS, such as the BS 110, for configuration of a PUSCH communication including a spatial filter corresponding to a TCI state, means for receiving, based on the SRS, a downlink control information (DCI) that schedules or activates the PUSCH communication, among other examples, or combinations thereof. In some aspects, such means may include one or more components of the UE 120 described in connection with FIG. 2, such as the controller/processor 280, the transmit processor 264, the TX MIMO processor 266, the MOD 254, one or more antennas 252, the DEMOD 254, the MIMO detector 256, or the receive processor 258.

In some aspects, the base station 110 may include means for receiving an SRS associated with configuration of a PUSCH communication including a spatial filter corresponding to a TCI state, means for transmitting, based on the SRS, a DCI that schedules or activates the PUSCH communication, among other examples, or combinations thereof. In some aspects, such means may include one or more components of the base station 110 described in connection with FIG. 2, such as one or more antennas 234, the DEMOD 232, the MIMO detector 236, the receive processor 238, the controller/processor 240, the transmit processor 220, the TX MIMO processor 230, the MOD 232, or the antenna 234, among other examples.

While blocks in FIG. 2 are illustrated as distinct components, the functions described herein with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
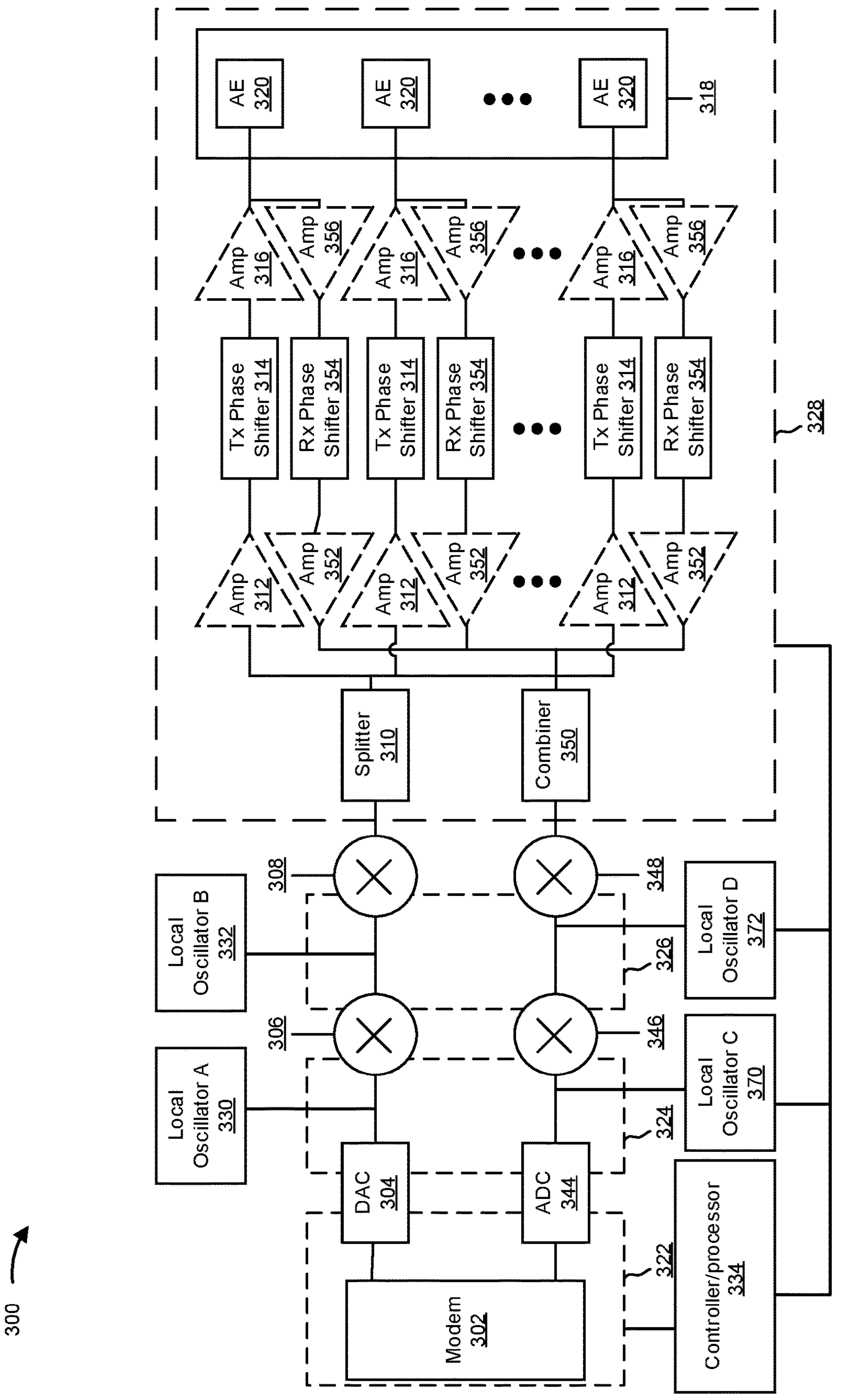
FIG. 3 is a diagram illustrating an example of beamforming architecture that supports beamforming for millimeter wave (mmW) communications.

FIG. 3 is a diagram illustrating an example beamforming architecture 300 that supports beamforming for millimeter wave (mmW) communications. In some aspects, architecture 300 may implement aspects of wireless network 100. In some aspects, architecture 300 may be implemented in a transmitting device (such as a first wireless communication device, UE, or base station) or a receiving device (such as a second wireless communication device, UE, or BS), as described herein.

Broadly, FIG. 3 is a diagram illustrating example hardware components of a wireless communication device in accordance with certain aspects of the disclosure. The illustrated components may include those that may be used for antenna element selection or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, traces, or similar connections are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (such as to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306 and 308, splitter 310, first amplifiers 312, phase shifters 314, or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 or the controller/processor 334 may adjust the frequency of local oscillator A 330 or the local oscillator B 332 so that a desired IF or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312 and 316, phase shifters 314, or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312 and 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312 and 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312 and 316 may provide a desired level of positive or negative gain. A positive gain (positive dB) may be used to increase an amplitude of a signal for radiation by a specific antenna element 320. A negative gain (negative dB) may be used to decrease an amplitude or suppress radiation of the signal by a specific antenna element. Each of the amplifiers 312 and 316 may be controlled independently (for example, by the modem 302 or the controller/processor 334) to provide independent control of the gain for each antenna element 320. For example, the modem 302 or the controller/processor 334 may have at least one control line connected to each of the splitter 310, first amplifiers 312, phase shifters 314, or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (such as for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352 and 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (for example, not connected to a power source), which may result in some insertion loss. The combiner 350 may be an active combiner (for example, connected to a power source), which may result in some signal gain. When combiner 350 is an active combiner, it may provide a different (such as configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, or similar operations.

The architecture 300 is given by way of example only to illustrate an architecture for transmitting or receiving signals. In some cases, the architecture 300 or each portion of the architecture 300 may be repeated multiple times within an architecture to accommodate or provide an arbitrary number of RF chains, antenna elements, or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (for example, represented by different ones of the reference numbers 322, 324, 326, and 328) in different implemented architectures. For example, a split of the signal to be transmitted into multiple signals may take place at the analog RF, analog IF, analog baseband, or digital baseband frequencies in different examples. Similarly, amplification or phase shifts may also take place at different frequencies. For example, in some aspects, one or more of the splitter 310, amplifiers 312 and 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first or second amplifiers 312 and 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (such as for each antenna element chain) within the second mixer 308, and the local oscillator B 332 may supply different local oscillator signals (with different phase offsets) to each IF to RF mixer.

The modem 302 or the controller/processor 334 may control one or more of the other components 304 through 372 to select one or more antenna elements 320 or to form beams for transmission of one or more signals. For example, the antenna elements 320 may be individually selected or deselected for transmission of a signal (or signals) by controlling an amplitude of one or more corresponding amplifiers, such as the first amplifiers 312 or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312 and 316 of the multiple signals relative to each other. The controller/processor 334 may be located partially or fully within one or more other components of the architecture 300. For example, the controller/processor 334 may be located within the modem 302 in some aspects.

Figure 4:
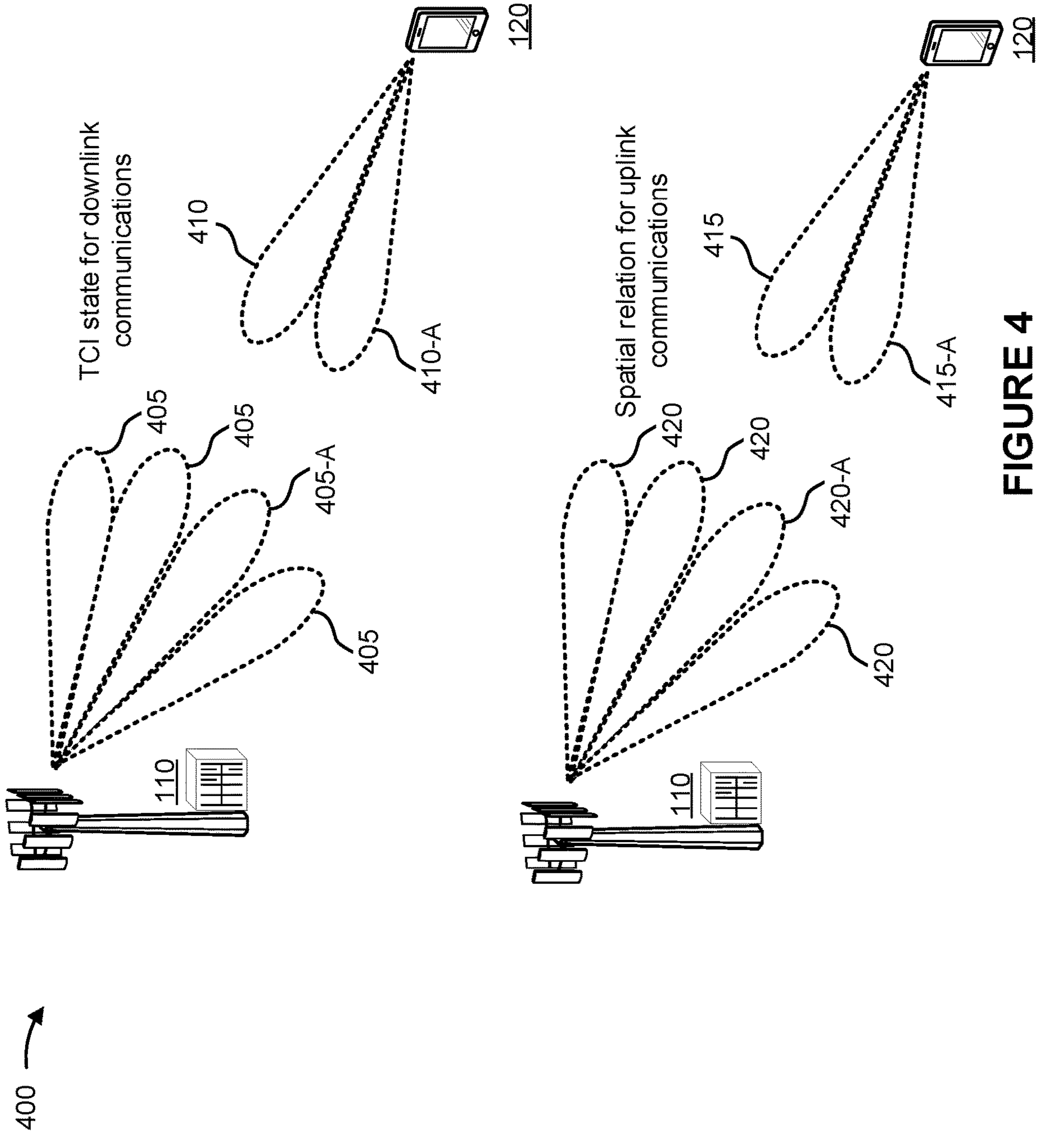
FIG. 4 is a diagram illustrating an example of using beams for communications between a BS and a UE.

FIG. 4 is a diagram illustrating an example 400 of using beams for communications between a BS and a UE. As shown in FIG. 4, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 405.

The UE 120 may attempt to receive downlink transmissions via one or more UE receive beams 410, which may be configured using different beamforming parameters at receive circuitry of the UE 120. The UE 120 may identify a particular BS transmit beam 405, shown as BS transmit beam 405-A, and a particular UE receive beam 410, shown as UE receive beam 410-A, that provide relatively favorable performance (for example, that have a best channel quality of the different measured combinations of BS transmit beams 405 and UE receive beams 410). In some examples, the UE 120 may transmit an indication of which BS transmit beam 405 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 405-A and the UE receive beam 410-A), which may be further refined and maintained in accordance with one or more established beam refinement procedures.

A downlink beam, such as a BS transmit beam 405 or a UE receive beam 410, may be associated with a TCI state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 405 may be associated with a SSB, and the UE 120 may indicate a preferred BS transmit beam 405 by transmitting uplink transmissions in resources of the SSB that are associated with the preferred BS transmit beam 405. A particular SSB may have an associated TCI state (for example, for an antenna port or for beamforming). The base station 110 may, in some examples, indicate a downlink BS transmit beam 405 based on antenna port QCL properties that may be indicated by the TCI state. A TCI state may be associated with one downlink reference signal set (for example, an SSB and an aperiodic, periodic, or semi-persistent CSI-RS) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based on the base station 110 indicating a BS transmit beam 405 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 415.

The base station 110 may receive uplink transmissions via one or more BS receive beams 420. The base station 110 may identify a particular UE transmit beam 415, shown as UE transmit beam 415-A, and a particular BS receive beam 420, shown as BS receive beam 420-A, that provide relatively favorable performance (for example, that have a best channel quality of the different measured combinations of UE transmit beams 415 and BS receive beams 420). In some examples, the base station 110 may transmit an indication of which UE transmit beam 415 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 415-A and the BS receive beam 420-A), which may be further refined and maintained in accordance with one or more established beam refinement procedures. An uplink beam, such as a UE transmit beam 415 or a BS receive beam 420, may be associated with a spatial relation. A spatial relation may indicate a directionality or a characteristic of the uplink beam, similar to one or more QCL properties, as described herein.

Figure 5:
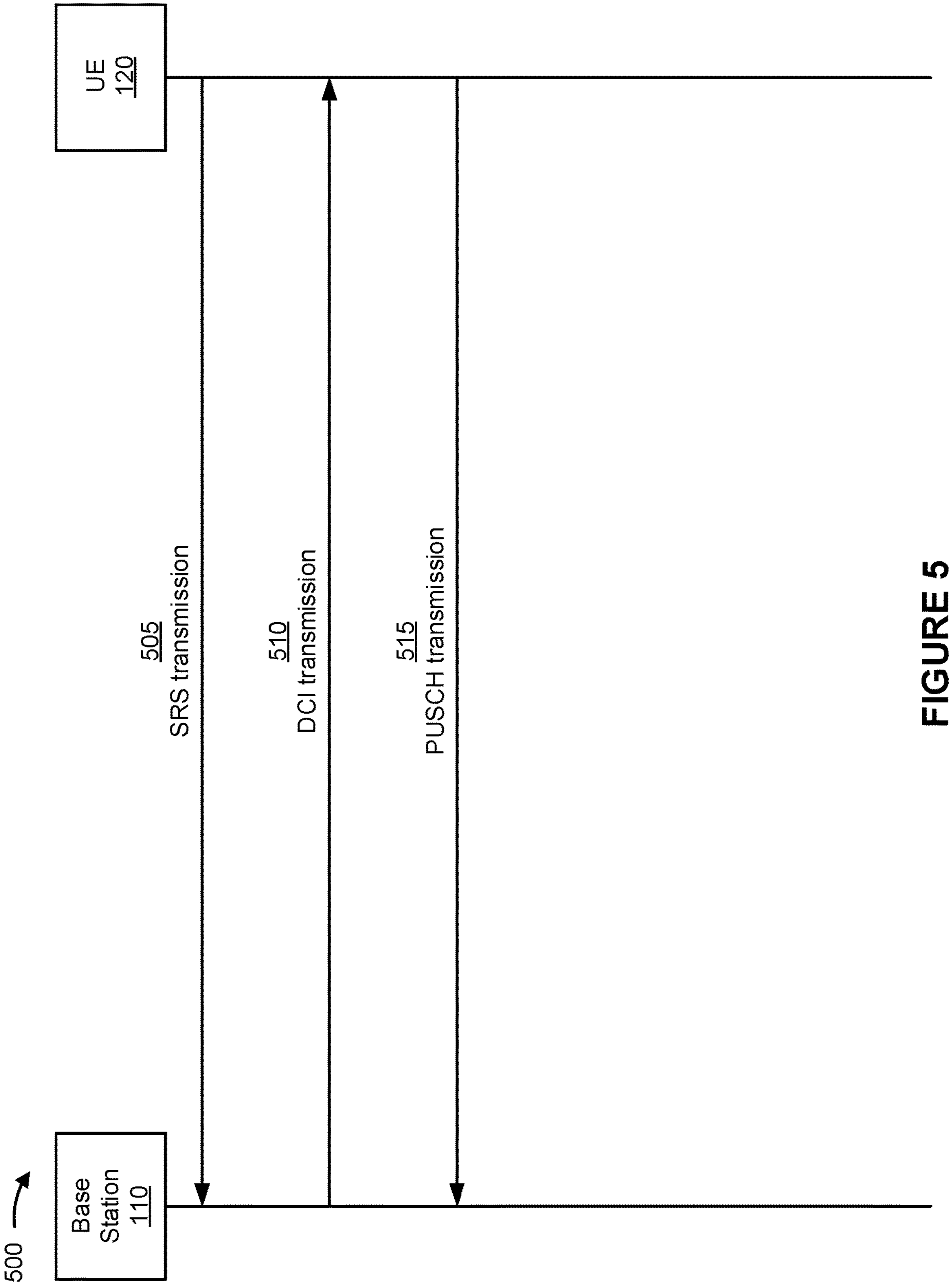
FIG. 5 is a diagram illustrating an example associated with physical uplink shared channel (PUSCH) transmission in joint downlink and uplink transmission configuration indicator (TCI) state scenarios.

FIG. 5 is a diagram illustrating an example 500 associated with PUSCH transmission in joint downlink and uplink TCI state scenarios. As shown in FIG. 5, a Base Station (BS) 110 and a UE 120 may communicate with one another, such as over wireless network 100 of FIG. 1. Although some aspects are described herein in terms of a BS 110 and a UE 120, other network scenarios may be possible, such as multi-TRP (mTRP) scenarios, as described in more detail herein. The BS 110 may send data or control information to the UE 120 over a downlink, and the UE 120 may send data or control information to the BS 110 over an uplink.

As shown by reference number 505, the UE 120 may transmit and the BS 110 may receive an SRS. For example, the UE 120 may be configured with one or more SRS resource sets with usage set to an RRC parameter "codebook." Further to the example, each resource set may have one or more SRS resources. In this example, the UE 120 may transmit and the BS 110 may receive the one or more SRS resources in the one or more SRS resource sets with usage set to "codebook" in connection with a codebook-based PUSCH. Alternatively, the UE 120 may be configured with one or more SRS resource sets with usage set to an RRC parameter, "non-codebook." Further to the alternative example, each resource set may have one or more SRS resources. In this case, the UE 120 may transmit and the BS 110 may receive the one or more SRS resources in the one or more SRS resource sets with usage set to "non-codebook" in connection with a non-codebook-based PUSCH. In some aspects, the UE 120 may use a spatial transmit filter for transmitting the SRS in connection with a codebook-based or non-codebook-based PUSCH. For example, the UE 120 may use a spatial transmit filter, indicated by a joint downlink and uplink TCI state received from the BS 110, for transmitting the SRS. The spatial transmit filter may shape a distribution of energy transmitted, such as in MIMO transmit modes, to avoid interference with other communications occurring concurrently with, for example, the SRS.

In some aspects, the UE 120 may determine the spatial transmit filter based on a spatial relationship information or QCL information in a TCI state. For example, the UE 120 may identify spatial relation information or a TCI state (a joint downlink and uplink TCI state) with spatial relation information for a PUSCH, and may use the spatial relation information to determine a spatial transmit filter for transmitting the PUSCH. In some cases, the one or more SRS resources and a subsequent PUSCH communication are indicated by the same joint downlink and uplink TCI state, uplink (only) TCI state, or spatial relation information, among other examples. In some cases, the spatial transmit filter determined in the joint TCI state, uplink TCI state, or spatial relation information indicated for the subsequent PUSCH may be one of the spatial transmit filters determined in a joint TCI state, uplink TCI state or spatial relation information indicated to the one or more SRS resources in connection with the PUSCH. In some cases, the joint TCI state, uplink TCI state, or spatial relation information indicated for the subsequent PUSCH may be one of the joint TCI states, uplink TCI states or spatial relation information indicated to the one or more SRS resources in connection with the PUSCH. In some other cases, the PUSCH may be associated with a joint TCI state, UL TCI state, or spatial relation information, used by the one or more SRS resources and selected or activated by a DCI, as described herein.

In some aspects, a TCI, which indicates the aforementioned TCI state, may include an identifier (ID). For example, the ID may be alphanumeric, hexadecimal, or another data type including information that identifies the TCI. In some aspects, the identifier may be in a field for common beam configurations. As an alternative, the identifier may be in a field shared between common beam configurations, downlink beam configurations, and uplink beam configurations. For example, the identifier may be included in a tci-StateId field as defined by the 3GPP specifications, or other similar data field.

The one or more reference signals, indicated by the TCI, may include a synchronization signal (such as an SSB), a CSI-RS, a sounding reference signal (SRS), a position reference signal (PRS), a physical random access channel (PRACH), a demodulation reference signal (DMRS), or a combination thereof. The DMRS may include a DMRS for a PDSCH, a PDCCH, a physical uplink shared channel (PUSCH), a physical uplink control channel (PUCCH), or other similar channel. The one more reference signals may provide one or more properties for the beam through one or more QCL rules. For example, the TCI may include one or more QCL-Info data structures, as defined by the 3GPP specifications, or other similar data structures, that define the QCL rules. The QCL rules may indicate the one or more properties provided by the one or more reference signals.

The one or more properties for the beam may be spatial, temporal, or otherwise related to a physical property of the beam. For example, the one or more properties may include a Doppler shift (such as when the QCL rule is a QCL-TypeA assumption, a QCL-TypeB assumption, or a QCL-TypeC assumption), a Doppler spread (such as when the QCL rule is a QCL-TypeA assumption or a QCL-TypeB assumption), an average delay (such as when the QCL rule is a QCL-TypeA assumption or a QCL-TypeC assumption), a delay spread (such as when the QCL rule is a QCL-TypeA assumption), a spatial reception filter (such as when the QCL rule is a QCL-TypeD assumption), spatial relation information for transmission, or a combination thereof.

As shown by reference number 510, the BS 110 may transmit and the UE 120 may receive a DCI transmission. For example, the UE 120 may receive the DCI transmission based on transmitting one or more SRS resources in connection with codebook-based PUSCH or non-codebook-based PUSCH. In some aspects, the BS 110 may transmit the DCI to trigger the UE 120 to transmit a PUSCH communication. For example, the BS 110 may transmit the DCI to schedule the PUSCH communication. Alternatively, the BS 110 may transmit the DCI to activate transmission of a PUSCH communication. In some aspects, the BS 110 may include information identifying a transmission precoding matrix indicator (TPMI) or a transmission rank in the DCI. For example, the BS 110 may determine the TPMI or the transmission rank based on the one or more SRS resources in connection with the PUSCH, and may include the TPMI or the transmission rank in the DCI to configure transmission parameters for the UE 120 for transmission of the PUSCH communication. In some aspects, the DCI may include an SRI indicating a selected SRS resource among the one or more transmitted SRS resources in connection with the PUSCH, from which the UE 120 may derive precoding and rank information for transmission of a non-codebook-based PUSCH communication. In some aspects, the UE may transmit a PUSCH communication using the same antenna port or antenna ports as the SRS port or SRS ports in SRS resources indicated by the DCI. For example, the UE may use the same antenna ports for the PUSCH communication as is indicated by the DCI when the SRS for an SRS resource indicator (SRI) is indicated by a DL and UL joint TCI state or an UL (only) TCI state.

As shown by reference number 515, the UE 120 may transmit and the BS 110 may receive a PUSCH communication. For example, the UE 120 may transmit the PUSCH communication based on receiving a DCI, which schedules or activates transmission of the PUSCH communication. In some aspects, the UE 120 may determine an SRI or a TCI state for the PUSCH communication based on the DCI. For example, when the UE 120 receives the DCI, which schedules the PUSCH communication, the DCI may include information identifying the SRI or the TCI state for the PUSCH communication.

Alternatively, in a case where a single SRS resource or a single SRS resource set is configured for PUSCH communication, and the single SRS resource or the single SRS resource set is indicated with a single joint downlink and uplink TCI state or uplink (only) TCI state, the DCI may not include information identifying the SRI or TCI state for the PUSCH communication. In this case, the PUSCH communication may be codebook based. For example, the UE 120 may use the TCI state indicated for the single SRS or the single SRS resource set as the TCI state for PUSCH communication. Similarly, in a multiple TRP deployment, such as when separate DCIs schedule transmission or receptions associated with separate TRPs, the DCIs received for scheduling PUSCHs associated with different TRPs may not include SRI information or TCI state information. As a result, a wireless communication device (which may correspond to the UE 120, described herein) may determine spatial relation information, a TCI state, or a spatial transmit filter for the PUSCH communication scheduled by a DCI associated with a TRP, based on, for example, spatial relation information, a TCI state, or a spatial transmit filter of the single SRS resource or the single SRS resource set associated with the same TRP.

Additionally, or alternatively, in a case that multiple SRS resources or multiple SRS resource sets are configured for PUSCH communication, and where multiple different joint downlink and uplink TCI states or uplink (only) TCI states are configured, the UE 120 may determine a TCI state for the PUSCH communication based on a TCI state indicated in the DCI (if there is a TCI state is indicated in the DCI). In such cases, the PUSCH communication may be codebook based. When the TCI state is not indicated in the DCI, the UE 120 may select an SRI-indicated TCI state used by at least one of the multiple SRS resources. In some aspects, multiple SRS resources or multiple SRS resource sets are configured for PUSCH communication, and multiple different joint downlink and uplink TCI states or uplink (only) TCI states are configured. In such aspects, the UE 120 may determine a TCI state, a spatial relation information, or a spatial transmit filter, among other examples, for the PUSCH communication based on an SRI indication indicated in the DCI (if the SRI is indicated in the DCI) for identifying an SRS or an SRS resource set.

Additionally, or alternatively, for non-codebook-based PUSCH communication, when the DCI does not include information identifying the TCI state for the PUSCH communication, the UE 120 may apply, to each layer of the PUSCH communication, the same TCI state as is applied to each selected SRS resource (selected based on an SRI indication in the DCI, as described herein). The selected SRS resources among the one or more transmitted SRS resources or SRS resource set may be indicated by a corresponding SRI in the DCI scheduling the PUSCH communication. In contrast, when the DCI does include information identifying the TCI state, the UE 120 may apply the indicated TCI states sequentially to each layer of the PUSCH communication.

In some aspects, the UE 120 may transmit the PUSCH communication using a selected antenna port. For example, the UE 120 may transmit the SRS communication using a selected antenna port and may transmit the PUSCH communication using the same selected antenna port. In some aspects, the UE 120 may select the antenna port based on an indication included in the DCI.

Figure 6:
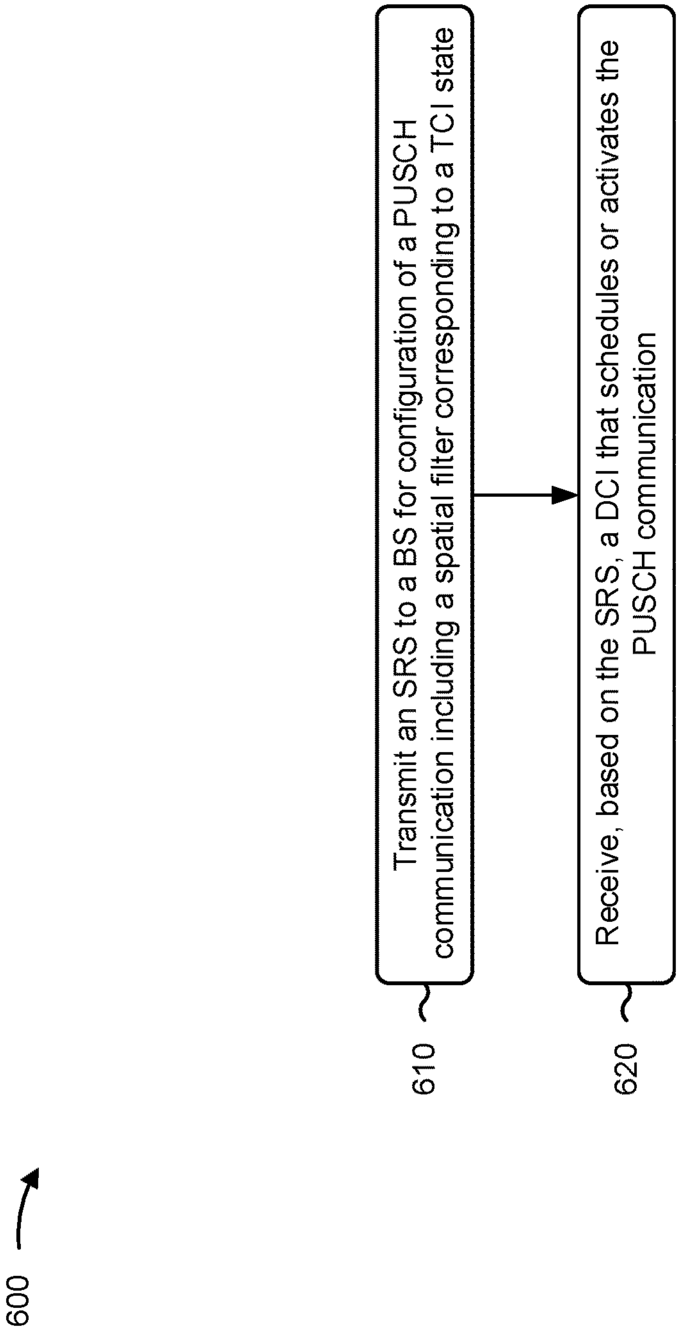
FIG. 6 is a diagram illustrating an example process performed, for example, by a wireless communication device, such as a UE.

FIG. 6 is a diagram illustrating an example process 600 performed, for example, by a wireless communication device, such as a UE. The process 600 is an example where the wireless communication device (such as the UE 120 of FIG. 1 or the apparatus 800 of FIG. 8, among other examples) performs operations associated with a PUSCH transmission in joint downlink and uplink TCI state scenarios.

As shown in FIG. 6, in some aspects, the process 600 may include transmitting an SRS to a BS for configuration of a PUSCH communication including a spatial filter corresponding to a TCI state (block 610). For example, the wireless communication device (such as by using transmission component 804, depicted in FIG. 8) may transmit an SRS to a BS for configuration of a PUSCH communication including a spatial filter corresponding to a TCI state, as described herein.

As shown in FIG. 6, in some aspects, the process 600 may include receiving, based on the SRS, a DCI that schedules or activates the PUSCH communication (block 620). For example, the wireless communication device (such as by using reception component 802, depicted in FIG. 8) may receive, based on the SRS, a DCI that schedules or activates the PUSCH communication, as described herein.

The process 600 may include additional aspects, such as any single aspect or any combination of aspects described below or in connection with one or more other processes described elsewhere herein.

In a first additional aspect, the PUSCH communication is a codebook-based PUSCH communication.

In a second additional aspect, alone or in combination with the first aspect, the TCI state is a joint downlink and uplink TCI state or an uplink TCI state.

In a third additional aspect, alone or in combination with one or more of the first and second aspects, another spatial transmit filter of the SRS corresponds to the TCI state, or a spatial reference signal of the TCI state.

In a fourth additional aspect, alone or in combination with one or more of the first through third aspects, the DCI identifies a transmitted precoding matrix indicator, or a transmission rank determined based on the SRS.

In a fifth additional aspect, alone or in combination with one or more of the first through fourth aspects, the DCI identifies the TCI state for the PUSCH communication, or an SRI.

In a sixth additional aspect, alone or in combination with one or more of the first through fifth aspects, the process 600 includes determining the TCI state for the PUSCH communication based on the DCI.

In a seventh additional aspect, alone or in combination with one or more of the first through sixth aspects, the DCI does not include information identifying the TCI state, and the process 600 includes determining the TCI state for the PUSCH communication based on the SRS.

In an eighth additional aspect, alone or in combination with one or more of the first through seventh aspects, transmitting the SRS includes transmitting the SRS using an antenna port, and transmitting the PUSCH communication using the antenna port.

In a ninth additional aspect, alone or in combination with one or more of the first through eighth aspects, the PUSCH communication is a non-codebook PUSCH communication.

In a tenth additional aspect, alone or in combination with one or more of the first through ninth aspects, the TCI state is applied on a per layer basis to the PUSCH.

In an eleventh additional aspect, alone or in combination with one or more of the first through tenth aspects, the wireless communication device is a UE or a TRP.

In a twelfth additional aspect, alone or in combination with one or more of the first through eleventh aspects, the DCI is an mDCI and the wireless communication device is operating in an mTRP communication mode.

Although FIG. 6 shows example blocks of the process 600, in some aspects, the process 600 may include additional blocks, fewer blocks, different blocks, or differently arranged blocks than those depicted in FIG. 6. Additionally, or alternatively, two or more of the blocks of the process 600 may be performed in parallel.

Figure 7:
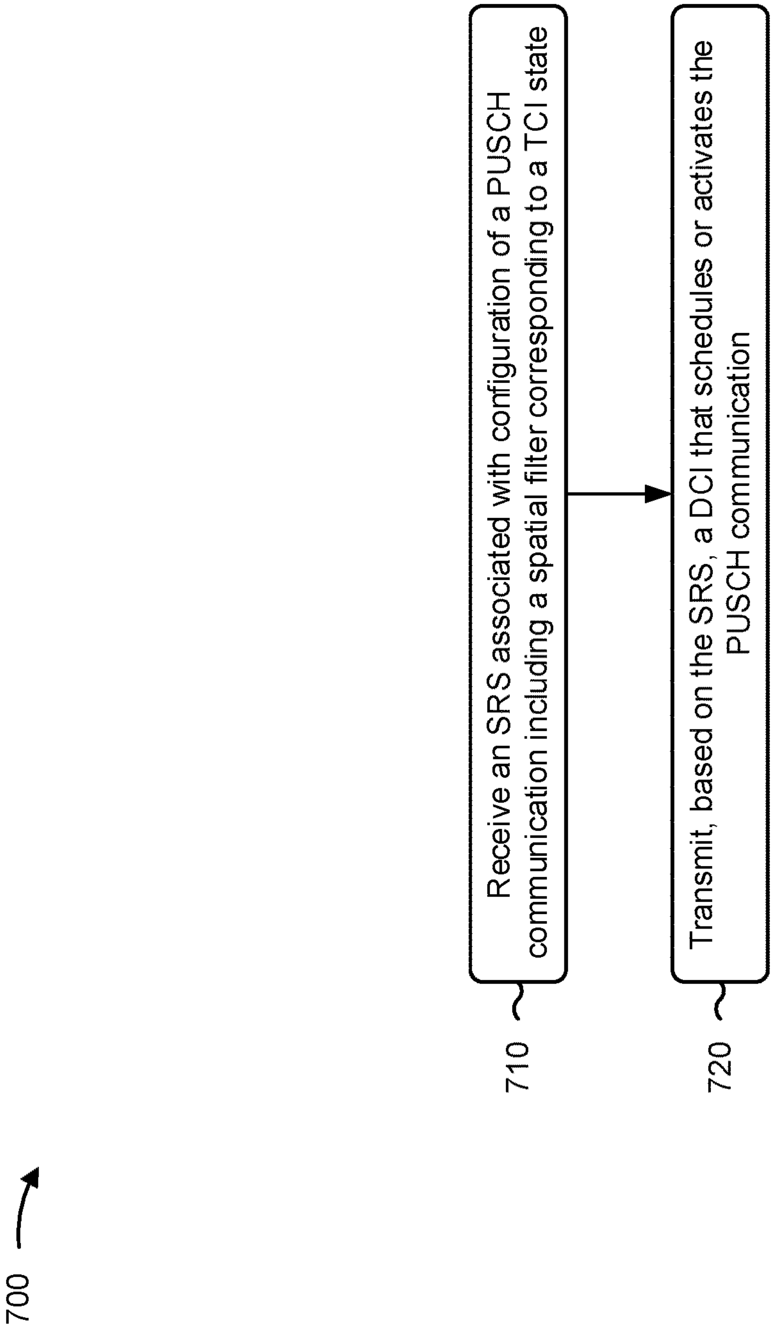
FIG. 7 is a diagram illustrating an example process performed, for example, by a BS.

FIG. 7 is a diagram illustrating an example process 700 performed, for example, by a BS. The process 700 is an example where the BS (such as the BS 110 of FIG. 1 or the apparatus 900 of FIG. 9, among other examples) performs operations associated with a PUSCH transmission in joint downlink and uplink TCI state scenarios.

As shown in FIG. 7, in some aspects, the process 700 may include receiving an SRS associated with configuration of a PUSCH communication including a spatial filter corresponding to a TCI state (block 710). For example, the BS (such as by using reception component 902, depicted in FIG. 9) may receive an SRS associated with configuration of a PUSCH communication including a spatial filter corresponding to a TCI state, as described herein.

As shown in FIG. 7, in some aspects, the process 700 may include transmitting, based on the SRS, a DCI that schedules or activates the PUSCH communication (block 720). For example, the BS (such as by using transmission component 904, depicted in FIG. 9) may transmit, based on the SRS, a DCI that schedules or activates the PUSCH communication, as described herein.

The process 700 may include additional aspects, such as any single aspect or any combination of aspects described below or in connection with one or more other processes described elsewhere herein.

In a first additional aspect, the PUSCH communication is a codebook-based PUSCH communication.

In a second additional aspect, alone or in combination with the first aspect, the TCI state is a joint downlink and uplink TCI state or an uplink TCI state.

In a third additional aspect, alone or in combination with one or more of the first and second aspects, another spatial transmit filter of the SRS corresponds to the TCI state, or a spatial reference signal of the TCI state.

In a fourth additional aspect, alone or in combination with one or more of the first through third aspects, the DCI identifies a transmitted precoding matrix indicator, or a transmission rank determined based on the SRS.

In a fifth additional aspect, alone or in combination with one or more of the first through fourth aspects, the DCI identifies the TCI state for the PUSCH communication, or a SRI.

In a sixth additional aspect, alone or in combination with one or more of the first through fifth aspects, the process 700 includes determining the TCI state for the PUSCH communication based on the DCI.

In a seventh additional aspect, alone or in combination with one or more of the first through sixth aspects, the DCI does not include information identifying the TCI state, and where process 700 includes determining the TCI state for the PUSCH communication based on the SRS.

In an eighth additional aspect, alone or in combination with one or more of the first through seventh aspects, receiving the SRS includes receiving the SRS using an antenna port, and receiving the PUSCH communication using the antenna port.

In a ninth additional aspect, alone or in combination with one or more of the first through eighth aspects, the PUSCH communication is a non-codebook PUSCH communication.

In a tenth additional aspect, alone or in combination with one or more of the first through ninth aspects, the TCI state is applied on a per layer basis to the PUSCH.

In an eleventh additional aspect, alone or in combination with one or more of the first through tenth aspects, the DCI is an mDCI and the UE is operating in an mTRP communication mode.

Although FIG. 7 shows example blocks of the process 700, in some aspects, the process 700 may include additional blocks, fewer blocks, different blocks, or differently arranged blocks than those depicted in FIG. 7. Additionally, or alternatively, two or more of the blocks of the process 700 may be performed in parallel.

Figure 8:
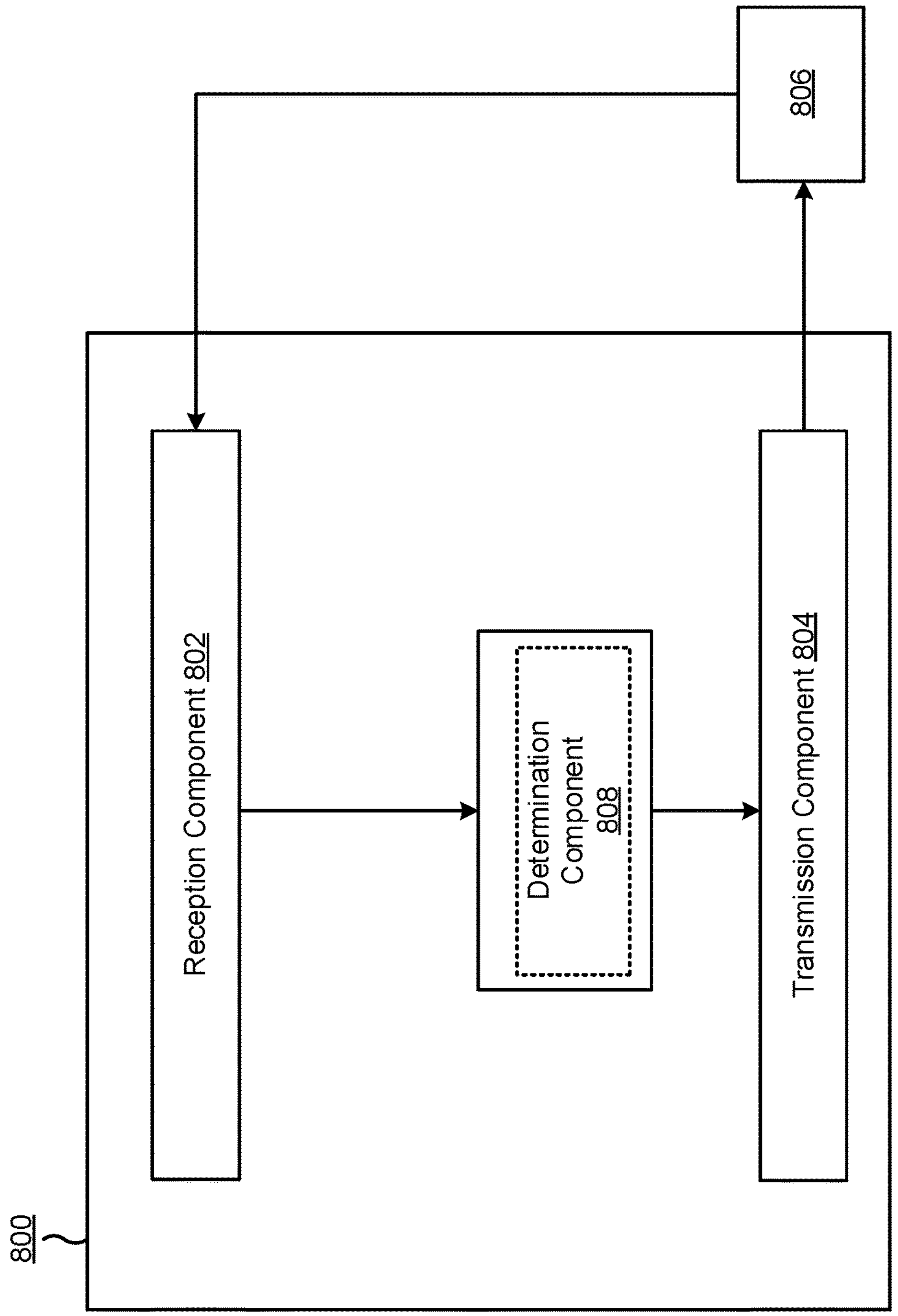
FIGS. 8 and 9 are block diagrams of example apparatuses for wireless communication.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses or one or more other components). Additionally, or alternatively, the apparatus 800 may be another type of wireless communication device, such as a TRP (in a multi-TRP deployment). As shown, the apparatus 800 may communicate with another apparatus 806 (such as the UE 120 of FIG. 2, the BS 110 of FIG. 2, or another wireless communication device) using the reception component 802 and the transmission component 804. As further shown, the apparatus 800 may include a determination component 808.

In some aspects, the apparatus 800 may be configured to perform one or more operations described herein in connection with FIG. 5. Additionally or alternatively, the apparatus 800 may be configured to perform one or more processes described herein, such as process 600 of FIG. 6 among other examples. In some aspects, the apparatus 800 or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2. In some aspects, the reception component 802 may be a component of a processing system. For example, a processing system of the apparatus 800 may refer to a system including the various other components or subcomponents of the apparatus 800.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be collocated with the reception component 802 in a transceiver. In some aspects, the transmission component 804 may be a component of a processing system.

The processing system of the apparatus 800 may interface with other components of the apparatus 800, and may process information received from other components (such as inputs or signals), output information to other components, etc. For example, a chip or modem of the apparatus 800 may include a processing system, the reception component 802 to receive or obtain information, and the transmission component 804 to output, transmit or provide information. In some cases, the reception component 802 may refer to an interface between the processing system of the chip or modem and a receiver, such that the apparatus 800 may receive information or signal inputs, and the information may be passed to the processing system. In some cases, the transmission component 804 may refer to an interface between the processing system of the chip or modem and a transmitter, such that the apparatus 800 may transmit information output from the chip or modem. A person having ordinary skill in the art will readily recognize that the second interface also may obtain or receive information or signal inputs, and the first interface also may output, transmit or provide information.

In some aspects, the transmission component 804 may transmit an SRS. For example, the transmission component 804 may transmit one or more SRS resources for codebook-based or non-codebook-based PUSCH communication. In some aspects, the reception component 802 may receive, from the apparatus 806 and based on the transmission component 804 transmitting an SRS, a DCI scheduling a PUSCH communication, where the DCI includes, for example, an indication of a TCI or an SRI, among other examples. In some aspects, the reception component 802 may receive, based on the transmission component 804 transmitting an SRS, a DCI that schedules or activates transmission of a PUSCH communication.

In some aspects, the determination component 808 may determine a parameter associated with a joint downlink and uplink TCI, such as a spatial filter or other spatial relationship parameter. For example, the determination component 808 may determine a TCI state for a PUSCH communication based on a DCI or an SRS, among other examples. In some aspects, the determination component 808 may include a transmit processor, a receive processor, a controller/processor, a memory, or a combination thereof, of the UE described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
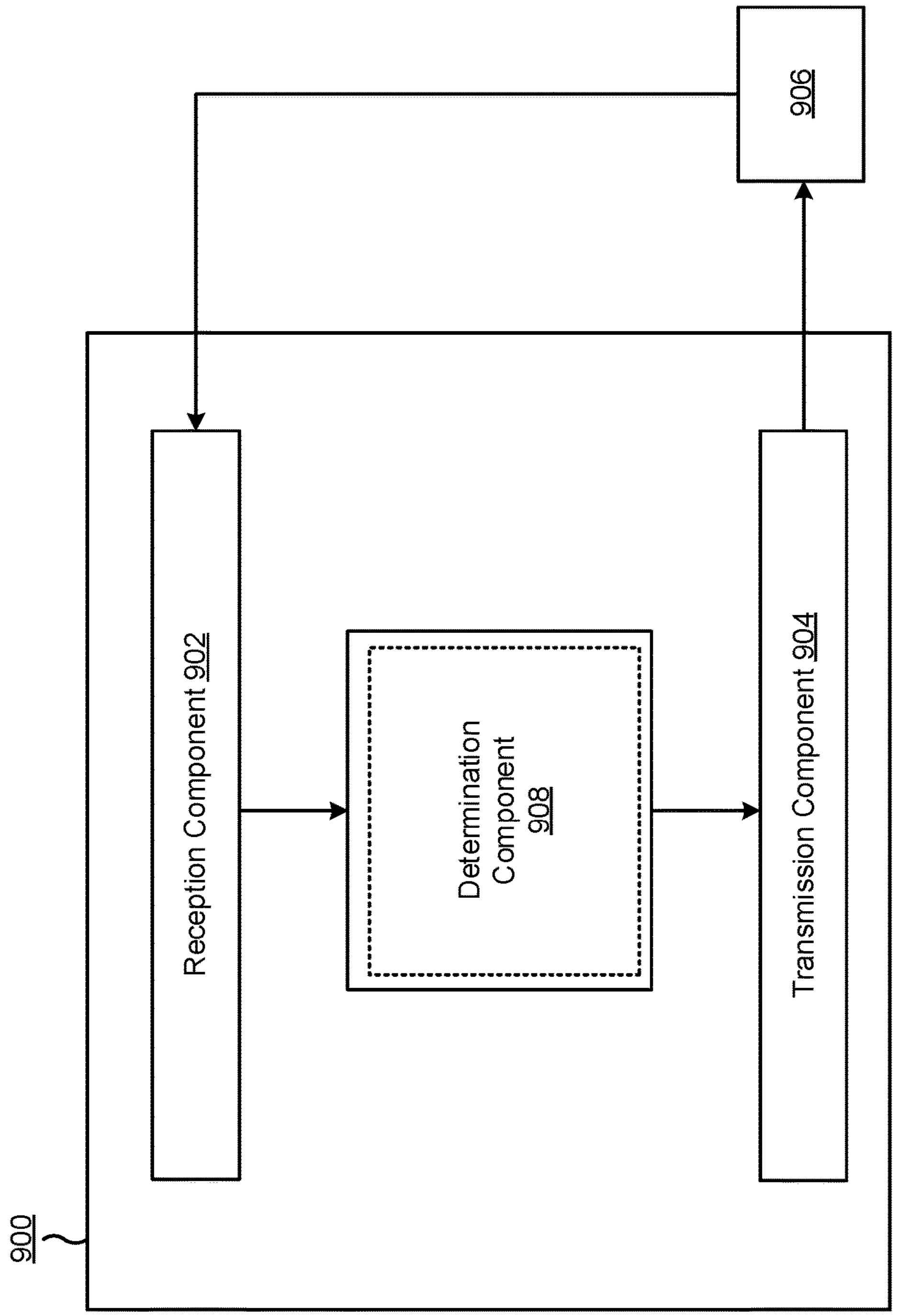

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses or one or more other components). As shown, the apparatus 900 may communicate with another apparatus 906 (such as the UE 120 of FIG. 2, the BS 110 of FIG. 2, or another wireless communication device) using the reception component 902 and the transmission component 904. As further shown, the apparatus 900 may include a determination component 908, among other examples.

In some aspects, the apparatus 900 may be configured to perform one or more operations described herein in connection with FIG. 5. Additionally or alternatively, the apparatus 900 may be configured to perform one or more processes described herein, such as process 700 of FIG. 7, among other examples. In some aspects, the apparatus 900 or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2. In some aspects, the reception component 902 may be a component of a processing system. For example, a processing system of the apparatus 900 may refer to a system including the various other components or subcomponents of the apparatus 900.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be collocated with the reception component 902 in a transceiver. In some aspects, the transmission component 904 may be a component of a processing system.

The processing system of the apparatus 900 may interface with other components of the apparatus 900, and may process information received from other components (such as inputs or signals), output information to other components, etc. For example, a chip or modem of the apparatus 900 may include a processing system, the reception component 902 to receive or obtain information, and the transmission component 904 to output, transmit or provide information. In some cases, the reception component 902 may refer to an interface between the processing system of the chip or modem and a receiver, such that the apparatus 900 may receive information or signal inputs, and the information may be passed to the processing system. In some cases, the transmission component 904 may refer to an interface between the processing system of the chip or modem and a transmitter, such that the apparatus 900 may transmit information output from the chip or modem. A person having ordinary skill in the art will readily recognize that the second interface also may obtain or receive information or signal inputs, and the first interface also may output, transmit, or provide information.

In some aspects, the reception component 902 may receive an SRS from, for example, the apparatus 906. In some aspects, the determination component 908 may determine a parameter associated with a joint downlink and uplink TCI, such as a spatial filter or other spatial relationship parameter. For example, the determination component 908 may determine a TCI state for a PUSCH communication and may determine a configuration of a DCI or an SRS to enable the apparatus 906 to determine the TCI state for the PUSCH communication. In some aspects, the determination component 908 may include a transmit processor, a receive processor, a controller/processor, a memory, or a combination thereof, of the UE described above in connection with FIG. 2. In some aspects, the transmission component 904 may transmit, to the apparatus 906, a DCI that includes, for example, an indication of a TCI state and that schedules or activates a PUSCH communication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, satisfying a threshold may refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a-b, a-c, b-c, and a-b-c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described herein should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a wireless communication device, comprising:
  transmitting a sounding reference signal (SRS) to a base station (BS) using a spatial filter corresponding to a transmission configuration indicator (TCI) state, the SRS being for configuration of a non-codebook-based physical uplink shared channel (PUSCH) communication; and
  receiving, based on the SRS, a downlink control information (DCI) that schedules or activates the non-codebook-based PUSCH communication, wherein the DCI includes a sounding reference signal resource indicator (SRI) indication indicating selected SRS resources, and wherein, based on the SRI indication, the same TCI state as is applied to each selected SRS resource is applied to each layer of the non-codebook-based PUSCH communication.

2. The method of claim 1, wherein the TCI state is a joint downlink and uplink TCI state or an uplink TCI state.

3. The method of claim 1, wherein a second spatial filter of the SRS corresponds to:
  the TCI state, or
  a spatial reference signal of the TCI state.

4. The method of claim 1, wherein the DCI identifies:
  a transmitted precoding matrix indicator, or
  a transmission rank determined based on the SRS.

5. The method of claim 1, wherein the DCI does not include information identifying the TCI state, and further comprising:
  determining the TCI state for the non-codebook-based PUSCH communication based on the SRS.

6. The method of claim 1, wherein transmitting the SRS comprises:
  transmitting the SRS using an antenna port; and
  transmitting the non-codebook-based PUSCH communication using the antenna port.

7. The method of claim 1, wherein the wireless communication device is a user equipment (UE) or a transmit receive point (TRP).

8. The method of claim 1, wherein the DCI is a multi-DCI (mDCI) and the wireless communication device is operating in a multi-transmit receive point (mTRP) communication mode.

9. The method of claim 1, wherein, when the DCI includes information identifying a plurality of TCI states, the method further comprises applying the identified plurality of TCI states sequentially to each layer of the non-codebook-based PUSCH communication.

10. The method of claim 1, wherein selected SRS resources are among one or more transmitted SRS resources or an SRS resource set.

11. The method of claim 1, wherein selected SRS resources are indicated by a corresponding sounding reference signal resource indicator (SRI) in the DCI scheduling the PUSCH communication.

12. The method of claim 1, wherein the DCI does not include information identifying the TCI state for the PUSCH communication.

13. The method of claim 1, wherein the TCI state is determined for the non-codebook-based PUSCH communication based on the SRS.

14. The method of claim 1, wherein transmitting the SRS comprises transmitting the SRS using an antenna port, and wherein the non-codebook-based PUSCH communication is transmitted using the antenna port.

15. The method of claim 1, wherein, when the DCI does not include information identifying the TCI state for the PUSCH communication, the method further comprises applying, to each layer of the non-codebook-based PUSCH communication, the same TCI state as is applied to each selected SRS resource.

16. An apparatus for wireless communication, comprising:

a first interface configured to output a sounding reference signal (SRS) using a spatial filter corresponding to a transmission configuration indicator (TCI) state, the SRS being for configuration of a non-codebook-based physical uplink shared channel (PUSCH) communication; and a second interface configured to obtain, based on the SRS, a downlink control information (DCI) that schedules or activates the non-codebook-based PUSCH communication, wherein the DCI includes a sounding reference signal resource indicator (SRI) indication indicating selected SRS resources, and wherein, based on the SRI indication, the same TCI state as is applied to each selected SRS resource is applied to each layer of the non-codebook-based PUSCH communication.

17. The apparatus of claim 16, wherein the TCI state is a joint downlink and uplink TCI state or an uplink TCI state.

18. The apparatus of claim 16, wherein a second spatial filter of the SRS corresponds to:

the TCI state, or a spatial reference signal of the TCI state.

19. The apparatus of claim 16, wherein the DCI identifies:

a transmitted precoding matrix indicator, or a transmission rank determined based on the SRS.

20. The apparatus of claim 16, wherein the DCI does not include information identifying the TCI state, and further a processing system configured to:

determine the TCI state for the non-codebook-based PUSCH communication based on the SRS.

21. The apparatus of claim 16, wherein the first interface, when configured to output the SRS, is configured to:

output the SRS using an antenna port; and output the non-codebook-based PUSCH communication using the antenna port.

22. The apparatus of claim 16, wherein the apparatus is included in a user equipment (UE) or a transmit receive point (TRP).

23. The apparatus of claim 16, wherein the DCI is a multi-DCI (mDCI) and the apparatus is operating in a multi-transmit receive point (mTRP) communication mode.

24. An apparatus for wireless communication, comprising:

means for transmitting a sounding reference signal (SRS) using a spatial filter corresponding to a transmission configuration indicator (TCI) state, the SRS being for configuration of a non-codebook-based physical uplink shared channel (PUSCH) communication; and means for receiving, based on the SRS, a downlink control information (DCI) that schedules or activates the non-codebook-based PUSCH communication, wherein the DCI includes a sounding reference signal resource indicator (SRI) indication indicating selected SRS resources, and wherein, based on the SRI indication, the same TCI state as is applied to each selected SRS resource is applied to each layer of the non-codebook-based PUSCH communication.

25. The apparatus of claim 24, wherein the same TCI state is a joint downlink and uplink TCI state or an uplink TCI state.

26. The apparatus of claim 24, wherein the means for transmitting the SRS comprises means for transmitting the SRS using an antenna port, and wherein the non-codebook-based PUSCH communication is transmitted using the antenna port.

27. The apparatus of claim 24, wherein the same TCI state is a joint downlink and uplink TCI state used in an intra-band carrier aggregation (CA) scenario.

28. A method of wireless communication performed by an apparatus of a base station (BS), comprising:

receiving a sounding reference signal (SRS) using a spatial filter corresponding to a transmission configuration indicator (TCI) state, the SRS being for configuration of a non-codebook-based physical uplink shared channel (PUSCH) communication; and transmitting, based on the SRS, a downlink control information (DCI) that schedules or activates the non-codebook-based PUSCH communication, wherein the DCI includes a sounding reference signal resource indicator (SRI) indication indicating selected SRS resources, and wherein, based on the SRI indication, a TCI state of a corresponding selected SRS resource is associated with each layer of the non-codebook-based PUSCH communication.

29. The method of claim 28, wherein the TCI state is a joint downlink and uplink TCI state or an uplink TCI state.

30. The method of claim 28, wherein a second spatial filter of the SRS corresponds to:

the TCI state, or a spatial reference signal of the TCI state.

31. The method of claim 28, wherein the TCI state of the corresponding selected SRS resource is a joint downlink and uplink TCI state or an uplink TCI state.

32. The method of claim 28, wherein the TCI state of the corresponding selected SRS resource is a joint downlink and uplink TCI state used in an intra-band carrier aggregation (CA) scenario.

33. An apparatus for wireless communication, comprising:

a first interface configured to obtain a sounding reference signal (SRS) using a spatial filter corresponding to a transmission configuration indicator (TCI) state, the SRS being for configuration of a non-codebook-based physical uplink shared channel (PUSCH) communication; and a second interface configured to output, based on the SRS, a downlink control information (DCI) for transmission that schedules or activates the non-codebook-based PUSCH communication, wherein the DCI includes a sounding reference signal resource indicator (SRI) indication indicating selected SRS resources, and wherein, based on the SRI indication, a TCI state of a corresponding selected SRS resource is associated with each layer of the non-codebook-based PUSCH communication.

34. The apparatus of claim 33, wherein the TCI state is a joint downlink and uplink TCI state or an uplink TCI state.

35. The apparatus of claim 33, wherein the TCI state of the corresponding selected SRS resource is a joint downlink and uplink TCI state used in an intra-band carrier aggregation (CA) scenario.

* * * * *